(12) United States Patent
Daniel et al.

(10) Patent No.: US 6,730,347 B2
(45) Date of Patent: May 4, 2004

(54) FROZEN AERATED CONFECTION

(75) Inventors: Adrian Daniel, Sharnbrook (GB); Timothy John Foster, Sharnbrook (GB); Leif Orjan Lundin, Vlaardingen (NL); Ian Timothy Norton, Sharnbrook (GB); Robin Sutton, Gloucester (GB)

(73) Assignee: Good Humor-Breyers Ice Cream, division of Conopco, Inc., Green Bay, WI (US)

( * ) Notice: Subject to any disclaimer, the term of this patent is extended or adjusted under 35 U.S.C. 154(b) by 0 days.

(21) Appl. No.: 09/742,612

(22) Filed: Dec. 21, 2000

(65) Prior Publication Data

US 2001/0031304 A1 Oct. 18, 2001

(30) Foreign Application Priority Data

Dec. 23, 1999 (GB) ................................ 9930531

(51) Int. Cl.⁷ ............................ A23G 9/00; A23G 9/04
(52) U.S. Cl. ...................................... 426/565; 426/571
(58) Field of Search .................................. 426/565, 571

(56) References Cited

U.S. PATENT DOCUMENTS

| 4,189,502 A | * | 2/1980 | Rubenstein ................. 426/249 |
| 4,297,379 A | | 10/1981 | Topalian et al. |
| 4,582,712 A | * | 4/1986 | Gonsalves et al. .......... 426/134 |
| 4,826,656 A | * | 5/1989 | Huber et al. ................. 426/565 |
| 6,379,736 B1 | * | 4/2002 | Destapano et al. ......... 426/565 |

FOREIGN PATENT DOCUMENTS

| EP | 0 037 205 | 10/1981 |
| EP | 147 483 | 7/1985 |
| EP | 249 446 | 9/1992 |
| EP | 508 529 | 6/1996 |
| GB | 979468 | 1/1965 |
| GB | 1 207 294 | * 9/1970 |
| GB | 1484167 | 9/1977 |
| GB | 1542698 | 3/1979 |
| JP | 1196261 | 8/1989 |
| JP | 3272651 | 12/1991 |
| JP | 11075699 | 3/1999 |

OTHER PUBLICATIONS

Search Report Under Section 17(5).
*Ice Cream*, Third Edition, AVI Publishing Company, Inc., W.S. Arbuckle.
Australia Search Report mailed Jul. 13, 2001.
Great Britain Search Report dated Apr. 11, 2002.
Austria Search Report dated Jan. 21, 2002.
French Search Report on FR 0016912 dated Apr. 9, 2001.
Dutch Search Report on NL 1016906 dated Apr. 25, 2001.
Portugal Search Report on No. 102544 dated Nov. 21, 2001.
Spain Search Report on No. 200003085 dated Aug. 12, 2002.
Tekinsen, O. et al., "Effect on some stabilizer mixtures on physical and organoleptic properties of Kahramanmaras ice cream", Vet. Fak Univ. Ankara, Turkey (1984).

* cited by examiner

*Primary Examiner*—Nina Bhat
(74) *Attorney, Agent, or Firm*—Gerard J. McGowan, Jr.

(57) ABSTRACT

Frozen aerated confection, containing no orchid product, but containing an effective amount of certain polysaccharides are prepared which exhibit at least the same extensibility as the one exhibited when orchid derived products are added.

4 Claims, 5 Drawing Sheets

ured in hot water (50–60° C.) before use.

FROZEN AERATED CONFECTION

FIELD OF THE INVENTION

The present invention relates to a frozen aerated confection. The present invention more specifically relates to an ice cream product of the 'Maras' type.

BACKGROUND OF THE INVENTION

In Turkey, artisanal type of ice cream is still a wide tradition. A specific type of artisanal ice cream called 'Maras' is very well known and much appreciated by consumers. The taste and structure are very typical. The ingredients used originally are sugar, goat milk and sahlep (sahlep is an ingredient extracted from the roots of Orchids. There are many types of orchids so many types of sahlep. There is very little information available on sahlep although some studies have shown that sahlep contains a mucilage which contains mannose. The mucilage varies in content from species to species, with the higher the content the greater the solution viscosity. Starch is also a component of sahlep which varies in amount similarly. It is claimed that the 'quality' of sahlep is dependant upon the amount of mucilage present and the amount of starch, sugar and total nitrogen has no effect on quality.

The production of Maras ice cream has a similar mystique. A recent Turkish magazine states that it is made using the milk from goats which have grazed on the pastures of Ahir, Dagi, sage, milk vetch and orchids. The milk is then mixed with ground sahlep and sugar, and boiled until 'the consistency is right', 'set aside for a while and then beaten for a long time'.

In the following description, this characteristic of Maras products will be described as extensibility. In order to clearly define this characteristic a specific test method had to be set up.

Now, sahlep is a scarce resource and there is a need for producing ice creams having the same structure as traditional 'Maras' products without having to use sahlep.

It has been found that, under formulation conditions, it is possible to produce ice creams having the same extensibility as Maras products without requiring the use of orchids and particularly without requiring the use of sahlep.

Tests and Definitions
Extensibility
Hereunder are described:
the sample preparation
the test procedure,
the data analysis
The extensibility is described with reference to the drawings wherein:

SAMPLE PREPARATION

On the day of testing a 500 ml block is taken from a −25° C. store and allowed to soften for 5 minutes at room temperature. Using a serrated knife it is cut into 1 cm wide strips, following the pre-drawn guidelines on the packet surface. Great care must be taken when cutting along these lines since it is essential that the strips are not smaller or greater than 10 mm in depth. An aid to cutting straight lines should be used, such as a mitre box. From one block, up to 14 strips can be cut, each having 92 mm×38 mm×10 mm dimensions.

The strips are then placed on silicon paper on a portable, hard, flat surface e.g. a hard, plastic chopping board. It is important that the strips are kept flat and not bent. A shaped test piece is then stamped from each of the strips using a cutter. The cutter stamps out a shape shown in FIG. 1. In the shape shown in FIG. 1, the shape has an indented area of reduced width on each side of and running along part of the length of the shape. The shape has an overall length of 80 mm, a width at its widest point (i.e. adjacent the ends) of 23 mm, a width at its narrowest point (i.e. adjacent the middle of the length of the shape) of 10 mm, and the length of the indented areas of 60 mm. The indented areas are substantially symmetrical, and are centred on the middle of the length of the shape.

Figure 1:
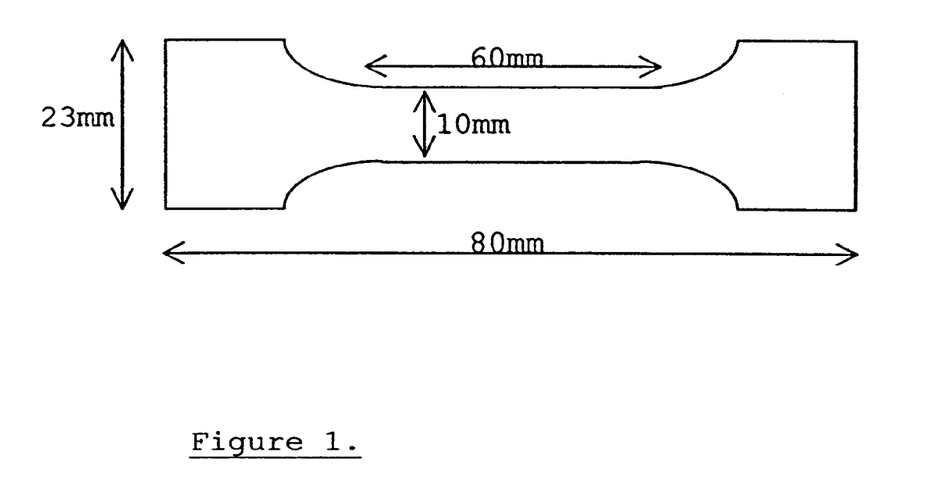
FIG. 1 represents a schematic view of a cutter used to stamp a test piece.

The cutter is warmed in hot water (50–60° C.) before use. This makes it easier to stamp the test piece and prevents the ice cream sticking to the cutter. Once cut, the ice cream test piece is not moved i.e. it is left on the silicon paper on the hard flat board. This is to avoid bending the sample. At least six test pieces are required from each sample. The test pieces should be held at room temperature for no longer than 13 minutes, therefore the time for cutting and stamping should not exceed 8 minutes.

Once cut and stamped the test pieces are returned to a cold store at −25° C. on the silicon paper and hard board for a minimum of 90 minutes.

Figure 2:
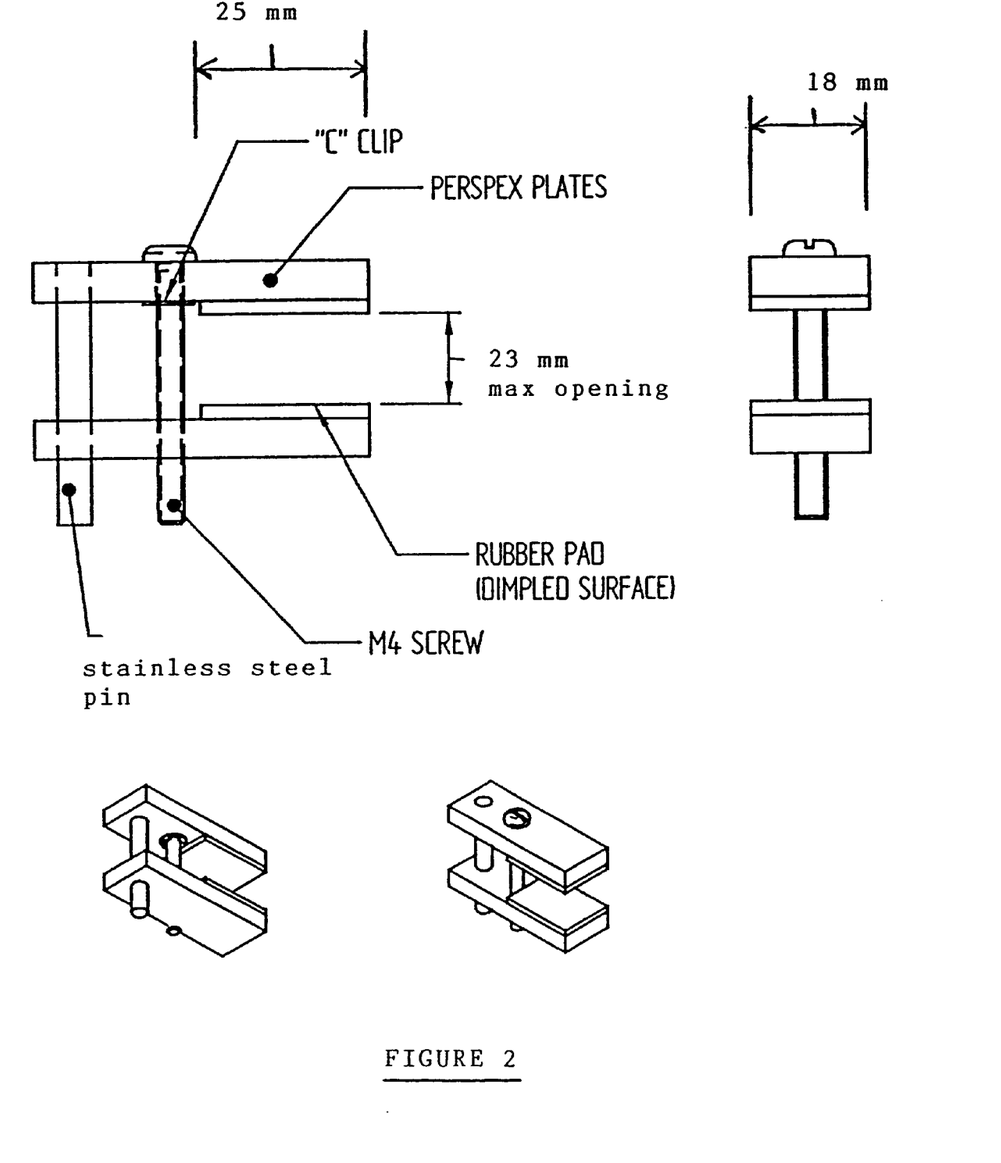
FIG. 2 represents a schematic view of a grip used to test a product.

After a minimum of 90 minutes has passed and still keeping the specimens at −25° C., the test piece is then placed into the test grips. The grip design is shown in FIG. 2. The grip comprises two Perspex plates 10, 12, joined together with a "C" clip 14 which comprises an M4 screw, and a stainless steel pin 16. Mounted on each Perspex plate 10, 12, is a rubber pad 18, 20, each of which has as dimpled surface. The distance "a" from the end of the Perspex plate to the edge of the "C" clip is 25 mm, and the spacing "b" between the rubber pads is 23 mm. The width of the grip "d" is 18 mm. The grip surface in contact with the ice cream is Foulds conveyer belt material (industrial strength food grade—confectionery grade), model V100 2 ply polyester with FDA with a white PVC top surface. The conveyer belt material is stuck to the rest of the grip with super glue, with the top surface at the bond interface ie. the dimpled surface free to grip the ice cream sample.

Care must be taken when handling the ice cream. The test piece must not be excessively bent nor stretched and holding it for too long will cause the sample to soften and melt. One grip is placed on each end of the test piece and tightened so that the test piece is held firmly in place but not excessively squashed (the grips must be closed to a gap no smaller than 8 mm). A metal gauge is used to make sure that the grips are located correctly, ensuring that the distance between the grips is 6 cm. It also prevents bending of the test piece during handling and loading onto the test machine, see FIG. 3 for the design and use of the metal gauge.

Figure 3:
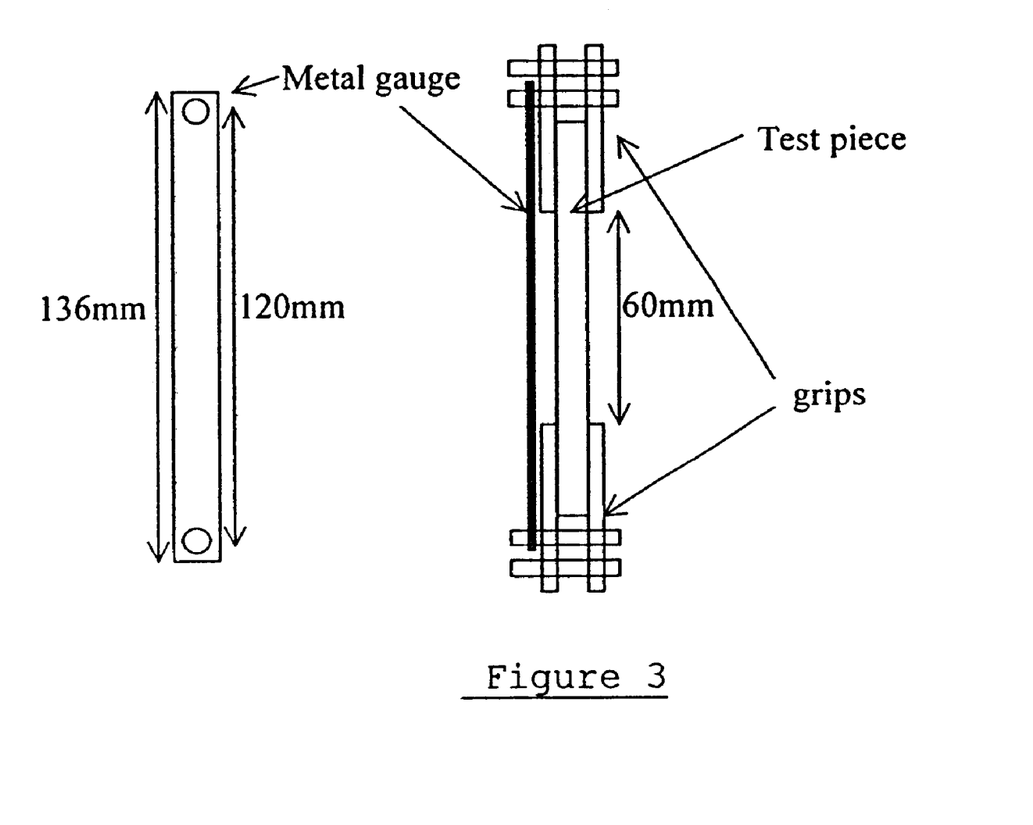
FIG. 3 represents a schematic view of two grips equipped with a metal gauge.

The metal gauge 32 shown in FIG. 3 has a total length of 136 mm and a length "e" between the centres of holes 34, 36 of 120 mm. Metal gauge 32 is attached to a pair of grips 38, 40 which hold a test piece 42. Distance "f" between the grips 38, 40 is 60 mm.

Once the grips and gauge are attached, the test pieces are moved to the testing area. This is done by placing them into a portable freezer set at −18° C. It is essential that the test pieces are handled with care. When being moved they must always be laid flat, without any test piece being placed on top of another. The minimum and maximum times held at −18° C. are 10 minutes and 2 hours respectively.

Test Procedure

A universal mechanical test machine with temperature controlled test cabinet is used for testing (Instron 4501). A 10 N (full scale measurement) load cell is used. The temperature control cabinet is set to −12° C. This is the temperature at which the test pieces are tested. The test machine must be set up to hold the grips so that the test piece is aligned vertically. Before any testing is performed, the test machine must be assembled with all attachments other than the test pieces and allowed to equilibrate at −12° C. for a minimum of 45 minutes.

When the test machine has equilibrated at −12° C. for 45 minutes, testing can begin. A test piece is removed from the portable freezer by holding the attached metal gauge (so that the sample does not bend) and transferred to the temperature cabinet and the grips attached to the test machine. The correct gap previously set, before loading, so as to attach the test piece without stretching or buckling. At this point the cross-head displacement measurement is offset to 0 mm and the load cell measurement offset to 0N. The test piece must be held in a vertical position. The cabinet door is closed and the test piece equilibrated at −12° C. for two minutes. Care must be taken so that the sample is not stretched prior to testing.

Figure 4:
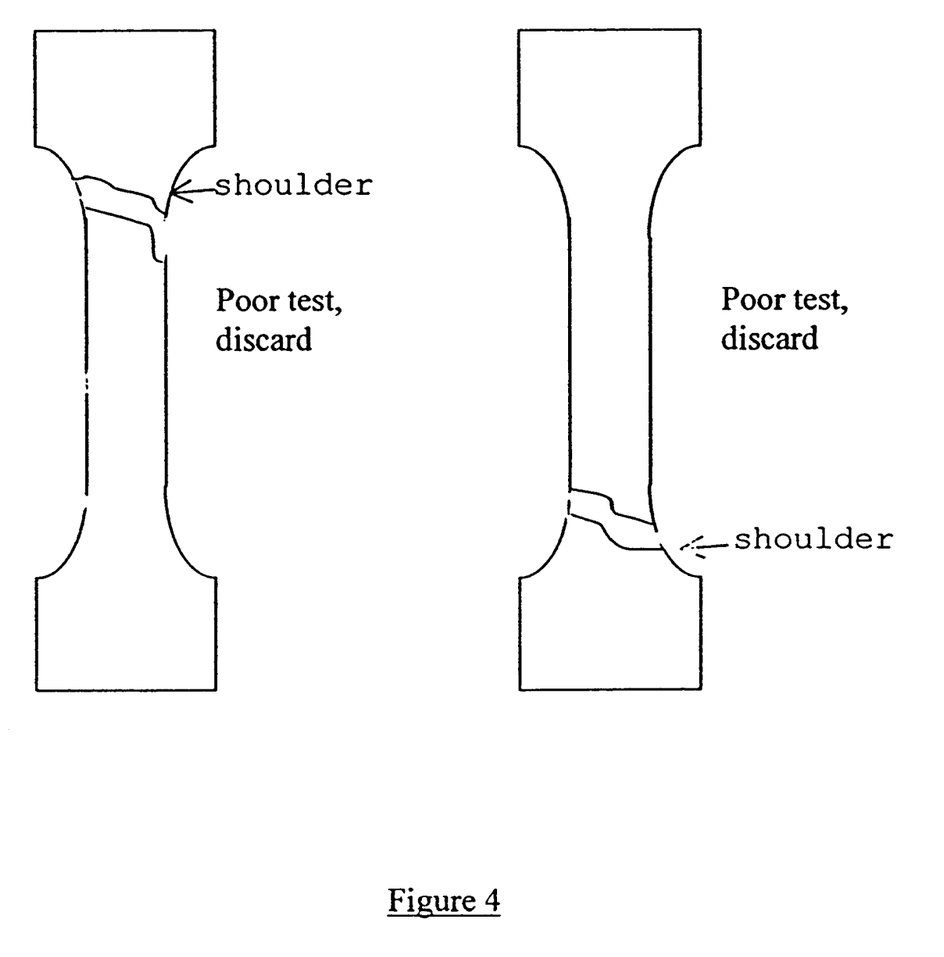
FIG. 4 represents a schematic view of test pieces breaking at the shoulder and being rejected.

After 2 minutes at −12° C., the test is performed. The test piece is pulled apart with the grips moving away from each other at a speed of 50 mm per minute. The force required to pull the test piece and the displacement of the grips are continually recorded during the test. The test piece must be observed during each test. Any test in which the test piece slips within either grip or breaks at the "shoulder" of the test piece (as shown in FIG. 4) is rejected, regarded as a poor test and discarded, and the data not used for analysis. When the test piece has completely broken in two, the test can be stopped and the broken sample removed. A minimum of six valid tests are required for each ice cream sample.

Data Analysis

Figure 5:
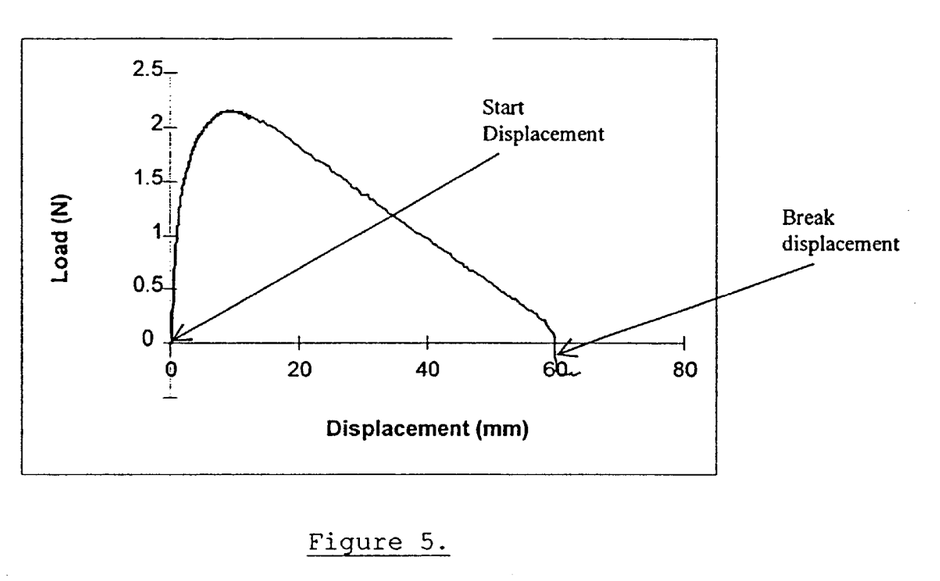
FIG. 5 shows a typical test data set.

The measured force is plotted against the grip displacement for the whole test. The displacement $d_f$ at which the force drops to zero after the maximum load has been reached is the point at which failure of the test piece occurs. $d_f$ is calculated by subtracting the start displacement from the break displacement. FIG. 5 shows a typical test data set.

Percentage strain to failure $\epsilon_f$ is defined as $$\epsilon_f = (d_f/60) \times 100$$

i.e. the displacement to failure is divided by the gauge length of test piece. The gauge length is that length of the test piece that is 10 mm wide (60 mm, see FIG. 1).

This is calculated for a minimum of six valid tests. The mean of these is calculated as well as the standard deviation. In FIG. 5, the measurements are;

| Break displacement (mm) | Start displacement (mm) | $d_f$ (mm) | strain % | Strain |
|---|---|---|---|---|
| 60.17 | 0.25 | 59.92 | 0.9986 | 99.86 |

The mean percentage strain to failure of at least six valid tests is defined as the extensibility of the sample.

Overrun

The overrun is defined as on page 194 of Ice Cream, Second Edition, W. S. Arbuckle—Avi Publishing Company.

GENERAL DESCRIPTION OF THE INVENTION

It is the object of the present invention to provide a frozen aerated confection, containing no orchid product, with an overrun of 15% to 80%, preferably 15% to 50%, and an extensibility of at least 30%.

By 'containing no orchid product' it is meant that the frozen aerated confection does not contain material extracted or derived from orchid and particularly no material extracted or derived from sahlep.

In a preferred embodiment of the present invention, the frozen aerated confection contains less than 0.5%, preferably less than 0.2%, even more preferably less than 0.1% (w/w) fat. In another preferred embodiment of the invention, the frozen aerated confection is an ice cream with a fat content of between 0.5% and 12% (w/w), preferably between 2% and 12% (w/w), even more preferably between 3% and 8.5% (w/w).

Preferably the overrun is less than 40% since it has been found that the higher the overrun, the lower the extensibility. More preferably the overrun is between 25% and 40%.

Preferably also, the extensibility is over 50% more preferably over 100%.

Preferably also, the frozen aerated confection contains an effective amount of polysaccharides selected from the group consisting in xanthan gum, guar gum, CMC, or any mixture thereof, even more preferably, the frozen aerated confection contains an effective amount of polysaccharides selected from the group consisting in xanthan gum, guar gum, or any mixture thereof.

Preferably also, the frozen aerated product contains an effective amount of protein selected from the group consisting in milk protein, soya protein, whey protein or any mixture thereof.

It is a second object of the present invention to provide a frozen aerated confection containing no orchid product an having an overrun of 15% to 80%, preferably 15% to 50%, and containing an effective amount of polysaccharides selected from the group consisting in xanthan gum, guar gum, CMC, or any mixture thereof, and an effective amount of protein selected from the group consisting in milk protein, soya protein, whey protein or any mixture thereof.

Preferably polysaccharides are selected from the group consisting in xantham gum and guar gum.

Preferably also, the frozen aerated confection contains 0.4% to 0.9% (w/w) guar gum and 1% to 5% (w/w) protein selected from the group consisting in milk protein, soya protein, whey protein or any mixture thereof. More preferably, the frozen aerated confection contains 1% to 5% (w/w) milk protein.

In another preferred embodiment of the present invention, the frozen aerated confection contains 0.4% to 0.9% (w/w) guar gum and 1% to 3% (w/w) soya protein.

DETAILED DESCRIPTION

The present invention will be illustrated in the following examples.

Frozen aerated confections having various formulations have been produced using standard equipment at various overruns (as for example described in Ice Cream, W. S. Arbuckle). These formulations are summarised in the tables here-below wherein the quantities are in parts by weight unless indicated otherwise and wherein:

formulation 1 is a formulation containing sahlep.

formulations 2, 3, 18, 19, 20 to 31, 40 to 46 and 53 are formulations according to the present invention.

formulations 4 to 17 and 47 to 52 are formulations which are illustrative of formulations which do not exhibit the required characteristics.

In the following tables;

SMP means skimmed milk powder (protein content of 35% w/w)

CNO means Coconut Oil

MGP means Mono Glyceride Palmitate

MD40 is a corn syrup with a 40 Dextrose Equivalent (DE)

CMC means Carboxy Methyl Cellulose

LBG means Locust Bean Gum.

|  | 1 | 2 | 3 | 4 | 5 | 6 | 7 |
|---|---|---|---|---|---|---|---|
| Water | 60.8 | 58.82 | 61.12 | 12.3 | 12.3 | 12.3 | 12.3 |
| SMP | 10.5 | 7.88 | 7.875 | 10.2 | 10.2 | 10.2 | 10.2 |
| Whole milk | — | — | — | 35.0 | 35.0 | 35.0 | 35.0 |
| 40% fat cream | 7.5 | — | 7.5 | 24.5 | 24.5 | 24.5 | 24.5 |
| 48% fat cream | — | — | — | — | — | — | — |
| CNO | — | 8.2 | — | — | — | — | — |
| Hymono 8903 | — | 0.4 | 0.4 | 0.5 | 0.5 | 0.5 | 0.5 |
| Butter oil | — | — | — | — | — | — | — |
| MGP | — | — | — | — | — | — | — |
| Sucrose | 14.0 | 14.0 | 14.0 | 10.7 | 10.7 | 10.7 | 10.7 |
| MD40 | 6.4 | — | 6.4 | 4.0 | 4.0 | 4.0 | 4.0 |
| Dextrose | — | — | — | 2.3 | 2.3 | 2.3 | 2.3 |
| Glucose syrup 63DE | — | 8.0 | — | — | — | — | — |
| Sodium chloride | — | — | — | 0.1 | 0.1 | 0.1 | 0.1 |
| Guar gum | 0.35 | 0.7 | 0.7 | — | — | — | 0.225 |
| Sahlep | 0.25 | — | — | — | — | — | — |
| Textra Starch | — | 2.0 | 2.0 | — | — | — | — |
| CMC 9M31F | 0.2 | — | — | 0.17 | 0.315 | 0.2975 | — |
| L100 Carrageenan | — | — | — | 0.03 | — | — | — |
| Xanthan | — | — | — | — | 0.035 | 0.0525 | 0.025 |
| Gelatin (250 bloom) | — | — | — | — | — | — | — |
| LBG | — | — | — | — | — | — | — |
| Tamarind gum | — | — | — | — | — | — | — |
| Pectin High Methoxy | — | — | — | — | — | — | — |
|  | 100 | 100 | 99.995 | 99.8 | 99.95 | 99.95 | 99.85 |
| Fat content (%) | 3.1 | 8.7 | 3.5 | 11.8 | 11.8 | 11.8 | 11.8 |

|  | 8 | 9 | 10 | 11 | 12 | 13 | 14 |
|---|---|---|---|---|---|---|---|
| Water | 12.3 | 59.54 | 63.325 | 63.125 | 62.6 | 63.125 | 12.0 |
| SMP | 10.2 | 10.0 | 7.875 | 7.875 | 10.4 | 7.875 | 10.2 |
| Whole milk | 35.0 | — | — | — | — | — | 35 |
| 40% fat cream | 24.5 | — | 7.5 | 7.5 | — | 7.5 | 24.5 |
| 48% fat cream | — | — | — | — | — | — | — |
| CNO | — | — | — | — | 8.0 | — | — |
| Hymono 8903 | 0.5 | — | 0.4 | 0.4 | 0.3 | 0.4 | 0.5 |
| Butter oil | — | 8.0 | — | — | — | — | — |
| MGP | — | 0.3 | — | — | — | — | — |
| Sucrose | 10.7 | 14.0 | 14.0 | 14.0 | 18.0 | 14.0 | 10.7 |
| MD40 | 4.0 | 8.0 | 6.4 | 6.4 | — | 6.4 | 4.0 |
| Dextrose | 2.3 | — | — | — | — | — | 2.3 |
| Glucose syrup 63DE | — | — | — | — | — | — | — |
| Sodium chloride | 0.1 | — | — | — | — | — | 0.1 |
| Guar gum | — | — | — | — | — | — | — |
| Sahlep | — | — | — | — | — | — | — |
| Textra Starch | — | — | — | — | — | — | — |
| CMC 9M31F | — | — | — | — | 0.48 | 0.7 | 0.595 |
| L100 Carrageenan | — | 0.016 | — | — | 0.09 | — | 0.07 |
| Xanthan | 0.1 | — | — | — | — | — | — |
| Gelatin (250 bloom) | 0.4 | — | — | — | — | — | — |
| LBG | — | 0.144 | 0.5 | 0.7 | 0.13 | — | — |
| Tamarind gum | — | — | — | — | — | — | 0.035 |
| Pectin High Methoxy | — | — | — | — | — | — | — |
|  | 100.1 | 100 | 100 | 100 | 100 | 100 | 100 |
| Fat content (%) | 11.8 | 8.4 | 3.5 | 3.5 | 8.4 | 3.5 | 11.8 |

-continued

|  | 15 | 16 | 17 | 18 | 19 | 20 | 21 |
|---|---|---|---|---|---|---|---|
| Water | — | 62.825 | 62.325 | 61.375 | 61.375 | 68.2 | 63.575 |
| SMP | — | 7.875 | 7.875 | 7.875 | 7.875 | 8.27 | 7.875 |
| Whole milk | 79.5 | — | — | — | — | — | — |
| 40% fat cream | — | 7.5 | 7.5 | 7.5 | 7.5 | — | 7.5 |
| 48% fat cream | — | — | — | — | — | — | — |
| CNO | — | — | — | — | — | — | — |
| Hymono 8903 | — | 0.4 | 0.4 | 0.4 | 0.4 | — | 0.4 |
| Butter oil | — | — | — | — | — | — | — |
| MGP | — | — | — | — | — | — | — |
| Sucrose | 20.0 | 14.0 | 14.0 | 14.0 | 14.0 | 14.4 | 14.0 |
| MD40 | — | 6.4 | 6.4 | 8.25 | 8.25 | 8.51 | 6.4 |
| Dextrose | — | — | — | — | — | — | — |
| Glucose syrup 63DE | — | — | — | — | — | — | — |
| Sodium chloride | — | — | — | — | — | — | — |
| Guar gum | — | — | — | 0.6 | 0.6 | 0.62 | — |
| Sahlep | — | — | — | — | — | — | — |
| Textra Starch | — | — | — | — | — | — | — |
| CMC 9M31F | 0.5 | — | — | — | — | — | — |
| L100 Carrageenan | — | — | — | — | — | — | — |
| Xanthan | — | — | — | — | — | — | 0.25 |
| Gelatin (250 bloom) | — | — | — | — | — | — | — |
| LBG | — | — | — | — | — | — | — |
| Tamarind gum | — | — | — | — | — | — | — |
| Pectin High Methoxy | — | 1.0 | 1.5 | — | — | — | — |
|  | 100 | 100 | 100 | 100 | 100 | 100 | 100 |
| Fat content (%) | 3.1 | 3.5 | 3.5 | 3.5 | 3.5 | 0 | 3.5 |

|  | 22 | 23 | 24 | 25 | 26/27 | 28/29 | 30 | 31 |
|---|---|---|---|---|---|---|---|---|
| Water | 58.3 | 62.3 | 58.6 | 62.6 | 60.725 | 58.725 | 64.54 | 53.7 |
| SMP | 11 | 7 | 11 | 7 | 7.875 | 7.875 | 10 | 16 |
| Whole milk |  |  |  |  |  |  |  |  |
| 40% fat cream | 7.5 | 7.5 | 7.5 | 7.5 | — | — |  | 7.5 |
| 48% fat cream |  |  |  |  | 9.6 | 9.6 |  |  |
| CNO |  |  |  |  | — | — |  |  |
| Hymono 8903 | 0.4 | 0.4 | 0.4 | 0.4 | 0.4 | 0.4 |  | 0.4 |
| Butter oil |  |  |  |  | — | — | 8 |  |
| MGP |  |  |  |  | — | — | 0.3 |  |
| Sucrose | 14 | 14 | 14 | 14 | 14.0 | 14.0 | 13 | 14 |
| MD40 | 8 | 8 | 8 | 8 | 6.7 | 6.7 | 4 | 8 |
| Dextrose |  |  |  |  | — | — |  |  |
| Glucose syrup 63DE |  |  |  |  |  |  |  |  |
| Sodium chloride |  |  |  |  | — | — |  |  |
| Guar gum | 0.8 | 0.8 | 0.5 | 0.5 | 0.7 | 0.7 |  |  |
| Sahlep |  |  |  |  | — | — |  |  |
| Textra Starch |  |  |  |  | — | 2.0 |  |  |
| CMC 9M31F |  |  |  |  | — | — |  |  |
| L100 Carrageenan |  |  |  |  | — | — | 0.016 |  |
| Xanthan |  |  |  |  | — | — |  |  |
| Gelatin (250 bloom) |  |  |  |  | — | — |  |  |
| LBG |  |  |  |  | — | — | 0.144 | 0.4 |
| Tamarind gum |  |  |  |  | — | — |  |  |
| Pectin High Methoxy |  |  |  |  | — | — |  |  |
|  | 100 | 100 | 100 | 100 | 100 | 100 | 100 | 100 |
| Fat content (%) | 3.5 | 3.5 | 3.5 | 3.5 | 5.1 | 5.1 | 8.4 | 3.6 |

|  | 40 | 41 | 42 | 43 | 44 | 45 | 46 | 47 |
|---|---|---|---|---|---|---|---|---|
| Water | 58.82 | 58.82 | 58.82 | 58.82 | 58.82 | 58.82 | 58.82 | 58.82 |
| SMP | 7.88 |  |  |  |  |  |  | 7.88 |
| Whole milk |  |  |  |  |  |  |  |  |
| 40% fat cream |  |  |  |  |  |  |  |  |
| 48% fat cream |  |  |  |  |  |  |  |  |
| CNO | 8.2 | 8.2 | 8.2 | 8.2 | 8.2 | 8.2 | 8.2 | 8.2 |
| Hymono 8903 | 0.4 | 0.4 | 0.4 | 0.4 | 0.4 | 0.4 | 0.4 | 0.4 |
| Butter oil |  |  |  |  |  |  |  |  |
| MGP |  |  |  |  |  |  |  |  |
| Sucrose | 14.0 | 14.0 | 14.0 | 14.0 | 14.0 | 14.0 | 14.0 | 14.0 |
| MD40 | 1.8 | 8.38 | 6.82 | 6.13 | 8.38 | 6.93 | 6.13 | 2.3 |
| Dextrose |  |  |  |  |  |  |  |  |
| Glucose syrup 63DE | 8.0 | 8.0 | 8.0 | 8.0 | 8.0 | 8.0 | 8.0 | 8.0 |
| Sodium chloride |  |  |  |  |  |  |  |  |
| Guar gum |  | 0.7 | 0.7 | 0.7 | 0.7 | 0.7 | 0.7 |  |
| Sahlep |  |  |  |  |  |  |  |  |

-continued

| | | | | | | | | |
|---|---|---|---|---|---|---|---|---|
| Textra Starch | | | | | | | | |
| CMC 9M31F | 0.9 | | | | | | | |
| L100 Carrageenan | | | | | | | | |
| Xanthan | | | | | | | | |
| Gelatin (250 bloom) | | | | | | | | |
| LBG | | | | | | | | |
| Tara gum | | | | | | | | 0.4 |
| Tamarind gum | | | | | | | | |
| Whey | | | | | 1.5 | 2.95 | 3.75 | |
| Soya | | 1.5 | 3.06 | 3.75 | | | | |
| Pectin High Methoxy | | | | | | | | |
| Fat content (%) | 8.67 | 8.63 | 8.67 | 8.69 | 8.60 | 8.60 | 8.60 | 8.67 |

| | 48 | 49 | 50 | 51 | 52 | 53 |
|---|---|---|---|---|---|---|
| Water | 58.82 | 58.82 | 58.62 | 55.92 | 58.82 | 58.82 |
| SMP | 7.88 | 7.88 | 7.88 | 7.88 | 7.88 | 7.88 |
| Whole milk | | | | | | |
| 40% fat cream | | | | | | |
| 48% fat cream | | | | | | |
| CNO | 8.2 | 8.2 | 8.2 | 8.2 | 8.2 | 8.2 |
| Hymono 8903 | 0.4 | 0.4 | 0.4 | 0.4 | 0.4 | 0.4 |
| Butter oil | | | | | | |
| MGP | | | | | | |
| Sucrose | 14.0 | 14.0 | 14.0 | 9.6 | 14.0 | 14.0 |
| MD40 | 2.0 | 1.8 | 0.9 | | 0.7 | |
| Dextrose | | | | | | |
| Glucose syrup 63DE | 8.0 | 8.0 | 8.0 | 8.0 | 8.0 | 8.0 |
| Sodium chloride | | | | | | |
| Guar gum | | | | | | |
| Sahlep | | | | | | |
| Textra Starch | | | 2.0 | 10.0 | | 2.0 |
| CMC 9M31F | | | | | | |
| L100 Carrageenan | | | | | | |
| Xanthan | | | | | | |
| Gelatin (250 bloom) | | | | | | |
| LBG | | | | | | |
| Tara gum | 0.7 | | | | | |
| Tamarind gum | | | | | | |
| Fenugreek | | | | | | 0.7 |
| Whey | | | | | | |
| Soya | | | | | | |
| Pectin High Methoxy | | 0.7 | | | 2.0 | |
| Fat content (% w/w) | 8.67 | 8.67 | 8.67 | 8.67 | 8.67 | 8.68 |

The extensibility of frozen confections having the above formulations has been tested at various overruns. The results summarised in the following table.

| Reference Number | Overrun | Extensibilty (mm) | Extensiblity (%) |
|---|---|---|---|
| 1 | 30% | 25.77 | 43% |
| | 45% | 15.42 | 26% |
| | 50% | 12.74 | 21% |
| 2 | 30% | 67.90 | 113% |
| | 45% | 42.77 | 71% |
| | 50% | 35.88 | 60% |
| 3 | 30% | 42.40 | 71% |
| | 45% | 17.99 | 30% |
| | 50% | 23.86 | 40% |
| 4 | 30% | 10.54 | 18% |
| | 45% | 10.10 | 17% |
| | 50% | 17.39 | 29% |
| 5 | 30% | 14.05 | 23% |
| | 45% | 6.73 | 11% |
| | 50% | 9.99 | 17% |
| 6 | 30% | 11.36 | 19% |
| | 45% | 9.72 | 16% |
| | 50% | 8.56 | 14% |
| 7 | 30% | 15.98 | 27% |
| | 50% | 10.31 | 17% |
| 8 | 30% | 11.72 | 20% |
| | 50% | 9.24 | 15% |
| 9 | 30% | 8.82 | 15% |
| | 45% | 6.39 | 11% |
| | 50% | 7.79 | 13% |
| 10 | Not measured | 2.83 | 5% |
| 11 | Not measured | 2.18 | 4% |
| 12 | 30% | 10.24 | 17% |
| | 50% | 7.67 | 13% |
| 13 | 30% | 11.46 | 19% |
| | 50% | 7.96 | 13% |
| 14 | 30% | 14.94 | 25% |
| | 50% | 7.93 | 13% |
| 15 | 30% | 8.23 | 14% |
| | 50% | 5.37 | 9% |
| 16 | 30% | 6.35 | 11% |
| | 50% | 4.43 | 7% |
| 17 | 30% | 4.36 | 7% |
| | 50% | 7.00 | 12% |
| 18 | 30% | 79.95 | 133% |
| 19 | 30% | 85.65 | 143% |
| 20 | 30% | 61.2 | 102% |
| 21 | 30% | 31.05 | 52% |
| 22 | 30% | 95.1 | 159% |

-continued

| Reference Number | Overrun | Extensibilty (mm) | Extensiblity (%) |
|---|---|---|---|
| 23 | 30% | 54.6 | 91% |
| 24 | 30% | 64.5 | 108% |
| 25 | 30% | 41.4 | 69% |
| 26 | 30% | 58.5 | 98% |
| 27 | 30% | 45.6 | 76% |
| 28 | 30% | 71.4 | 119% |
| 29 | 30% | 67.65 | 113% |
| 30 | Not measured | 7.8 | 13% |
| 31 | Not measured | 7.65 | 13% |
| 40 | 30% | 18.8 | 31% |
| 41 | 30% | 39.4 | 66% |
| 42 | 30% | 31 | 52% |
| 43 | 30% | 12.6 | 21% |
| 44 | 30% | 42.6 | 71% |
| 45 | 30% | 65.4 | 109% |
| 46 | 30% | 50 | 83% |
| 47 | 30% | 11.9 | 20% |
| 48 | 30% | 8.1 | 14% |
| 49 | 30% | 7.4 | 12% |
| 50 | 30% | 11.7 | 19% |
| 51 | 30% | 17.6 | 29% |
| 52 | 30% | 9.9 | 17% |
| 53 | 30% | 25.3 | 42% |

From these results, it can be seen that the ability to create an extensible frozen confection does not depend on the presence of (see example 20). However, increasing the fat content promotes an increase in extensibility when the extensibility is already present.

It can also be noted that the presence of starch increases the extensibility properties as it can be seen when comparing examples 28 and 29 with examples 26 and 27. Nevertheless, starch as the sole polysaccharide does not provide the required extensibility (Examples 50–51)

The unexpected negative influence of the overrun on the extensibility is particularly exemplified in example 2 but can also be seen in all the other examples where tests at different overruns have been performed.

A thorough investigation of other polymers such as tara gum, LBG, Gelatin and Pectin did not lead to the required extensibility.

CMC shows that a minimum amount of polysaccharide and/or a certain ratio of polysaccharide to protein is required in some cases to provide the required extensibility (examples 13 and 40). Example 42 and 43 show the same.

What is claimed is:

1. Frozen aerated confection containing no orchid product and having an overrun of 15% to 50%, and containing an amount of polysaccharides selected from the group consisting of xanthan gum, guar gum, CMC, and mixtures thereof, and an amount of protein selected from the group consisting of milk protein, soya protein, whey protein and mixtures thereof, in effective amounts to provide extensibility to the frozen aerated confection at least comparable to a frozen confection containing orchid.

2. Frozen aerated confection according to claim 1 containing 0.4% to 0.9% (w/w) guar gum and 1% to 5% (w/w) protein selected from the group consisting of milk protein, soya protein, whey protein and mixtures thereof.

3. Frozen aerated confection according to claim 2 containing 1% to 5% (w/w) milk protein.

4. Frozen aerated confection according to claim 2 containing 0.4% to 0.9% (w/w) guar gum and 1% to 3% (w/w) soya protein.

\* \* \* \* \*